(12) United States Patent
Dahlman et al.

(10) Patent No.: US 6,222,875 B1
(45) Date of Patent: Apr. 24, 2001

(54) LOW-DELAY RATE DETECTION FOR VARIABLE RATE COMMUNICATION SYSTEMS

(75) Inventors: Erik Dahlman, Bromma; Fredrik Ovesjö, Solna, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/890,794

(22) Filed: Jul. 11, 1997

(51) Int. Cl.[7] .............................. H04K 1/00; H04L 7/00; H04B 7/216
(52) U.S. Cl. ........................ 375/200; 375/367; 370/342
(58) Field of Search ................................ 375/200–210, 375/367; 370/342, 335, 441

(56) References Cited

U.S. PATENT DOCUMENTS

| 5,204,876 | 4/1993 | Bruckert et al. | 375/200 |
| 5,230,003 | 7/1993 | Dent et al. | 714/762 |
| 5,309,474 | 5/1994 | Gilhousen et al. | 374/1 |
| 5,544,156 | 8/1996 | Teder et al. | 370/342 |
| 5,566,206 | 10/1996 | Butler et al. | 375/225 |
| 5,757,791 | * 5/1998 | Kanterakis et al. | 375/206 |

FOREIGN PATENT DOCUMENTS 680159   11/1995   (EP) .

* cited by examiner

*Primary Examiner*—Stephen Chin
*Assistant Examiner*—Albert Park
(74) *Attorney, Agent, or Firm*—Burns, Doane, Swecker & Mathis, L.L.P.

(57) ABSTRACT

Variable rate data transmissions are accommodated having BRI transmitted in the same frame as the data itself. When Walsh code spreading is employed, the despreading process can be split into two separate despreading operations, with buffering between the two operations. Buffering is made of the intermediate symbols between the despreading stages, and can be made at the maximum user data rate instead of the much higher chip rate. In this way, the size of the buffer in the receiver can be significantly reduced.

19 Claims, 3 Drawing Sheets

LOW-DELAY RATE DETECTION FOR VARIABLE RATE COMMUNICATION SYSTEMS

BACKGROUND

This invention generally relates to variable data rate transmissions and, more particularly, to techniques for efficiently detecting variable rate data transmission when explicit bit rate information is transmitted.

Cellular radio communication systems have recently been developed that use spread spectrum modulation and code division multiple access (CDMA) techniques. In a typical CDMA system, an information data stream to be transmitted is superimposed on a much-higher-bit-rate data stream sometimes known as a spreading code. Each symbol of the spreading code is commonly referred to as a chip. The information signal and the spreading code signal are typically combined by multiplication in a process sometimes called coding or spreading the information signal. Each information signal is allocated a unique spreading code. A plurality of coded information signals are transmitted as modulations of radio frequency carrier waves and are jointly received as a composite signal at a receiver. Each of the coded signals overlaps all of the other coded signals, as well as noise-related signals, in both frequency and time. By correlating the composite signal with one of the unique spreading codes, the corresponding information signal can be isolated and decoded.

As radiocommunication becomes more widely accepted, it will be desirable to provide various types of radiocommunication services to meet consumer demand. For example, support for facsimile, e-mail, video, internet access, etc. via radiocommunication systems is envisioned. Moreover, it is expected that users may wish to access different types of services at the same time. For example, a video conference between two users would involve both speech and video support. Some of these different services will require relatively high data rates compared with speech service that has been conventionally supplied by radio communication systems, while other services will require variable data rate service. Thus, it is anticipated that future radio communication systems will need to be able to support high data rate communications as well as variable data rate communications.

Several techniques have been developed to implement variable rate communications in CDMA radio communication systems. From the perspective of transmitting data at varying rates, these techniques include, for example, discontinuous transmission (DTX), variable spreading factors, multi-code transmission and variable forward error correction (FEC) coding. For systems employing DTX, transmission occurs only during a variable portion of each frame, i.e., a time period defined for transmitting a certain size block of data. The ratio between the portion of the frame used for transmission and the total frame time is commonly referred to as the duty cycle $\gamma$. For example, when transmitting at the highest possible rate, i.e., during the entire frame period, $\gamma=1$, while for zero rate transmissions, e.g., during a pause in speech, $\gamma=0$. DTX is used, for example, to provide variable data rate transmissions in systems designed in accordance with the U.S. standard entitled "Mobile Station-Base Station Compatibility Standard for Dual-Mode Wideband Spread Spectrum Cellular System", TIA/EIA Interim Standard TIA/EIA/IS-95 (July 1993) and its revision TIA/EIA Interim Standard TIA/EIA/IS-95-A (May 1995). Such standards that determine the features of U.S. cellular communication systems are promulgated by the Telecommunications Industry Association and the Electronic Industries Association located in Arlington, Va.

Varying the spreading factor is another known technique for providing variable data rate communication. As mentioned above, spread spectrum systems spread data signals across the available bandwidth by multiplying each of the data signals with spreading codes. By varying the number of code symbols or chips per data symbol, i.e., the spreading factor, while keeping the rate of the code symbols fixed, the effective data rate can be controllably varied. In typical implementations of the variable spreading factor approach, the spreading factor is limited by the relationship to $SF=2^k \times SF_{min}$ where $SF_{min}$ is the minimum allowed spreading factor corresponding to the highest allowed user rate.

Another known technique for varying the transmitted data rate is commonly referred to as multi-code transmission. According to this technique, data is transmitted using a variable number of spreading codes where the exact number of codes used depends on the instantaneous user bit rate. An example of multi-code transmission is described in U.S. patent application Ser. No. 08/636,648 entitled "Multi-Code Compressed Mode DS-CDMA Systems and Methods", filed on Apr. 23, 1996, the disclosure of which is incorporated here by reference.

Yet another technique for varying the transmitted data rate in radio communication systems involves varying the FEC. More specifically, the rate of the forward error correction (FEC) coding is varied by using code-puncturing and repetition or by switching between codes of different rates. In this way the user rate is varied while the channel bit rate is kept constant. Those skilled in the art will appreciate the similarities between varying the FEC and a variable spreading factor as mechanisms to implement variable rate transmission.

Regardless of the particular technique adopted in a radio-communication system for providing variable rate transmission capability, the receiver must know the particular data rate at which a signal is transmitted in order to properly detect and decode the received signal. Methods for informing the receiver of the instantaneous data rate of a received signal generally fall into two categories, systems which explicitly transmit bit rate information (BRI) along with the transmitted signal, and systems which provide the receiver with the capability to "blindly" determine the rate at which data has been transmitted, e.g., by trying different rates and looking for a correct cyclic redundancy check (CRC). U.S. Pat. No. 5,566,206 to Butler et al. provides an example of blind rate detection.

Both the transmission of explicit BRI and blind rate detection approaches have certain drawbacks. For example, blind rate detection results in relatively complex receivers due to the additional circuitry/logic needed to correctly identify one of a plurality of possible data transmission rates.

The transmission of explicit BRI also creates design issues. For example, the BRI can either be sent in the data frame before the data frame that it describes or in the same frame that it describes. If the BRI is transmitted in the previous frame, an extra delay of one frame will be introduced in the transmitter. That is, as soon as the data for a frame is available in the transmitter, the BRI for that frame is computed and transmitted, while the transmission of that data frame is delayed until the next frame period. This extra delay can be undesirable for low-delay services like speech, especially for large frame lengths.

On the other hand, if the BRI is transmitted in the same frame as the data, the receiver needs to buffer the received signal until it has detected and decoded the BRI for that frame. This solution leads to extra buffering in the receiver, and therefore additional cost and complexity.

Accordingly, it would be desirable to create new techniques and systems for allowing explicit rate information to be transmitted in the same frame that it describes, while minimizing the amount of buffering needed in the receiver.

SUMMARY

These and other problems of previous communication systems are solved by Applicants' invention, wherein variable rate data transmissions which use a variable spreading factor are accommodated having BRI transmitted in the same frame as the data itself. When Walsh code spreading is employed, the despreading process can be split into two separate despreading stages, with buffering between the two stages. Buffering can then be made at the maximum user data rate instead of the much higher chip rate. In this way, the size of the buffer can be significantly reduced.

At a first despreading stage, despreading can be performed using a first code which is common to all physical channels based upon the maximum user data rate and the property of Walsh code words that codes stem from common roots. After the BRI is decoded, e.g., from a physical control channel, this information is then provided to a second despreading stage which determines the individual code words associated with each physical channel to be decoded.

BRIEF DESCRIPTION OF THE DRAWINGS

The features and objects of Applicants' invention will be understood by reading this description in conjunction with the drawings, in which.

DETAILED DESCRIPTION

While this description is written in the context of cellular communications systems involving portable or mobile radio telephones, it will be understood by those skilled in the art that Applicants' invention may be applied to other communications applications.

According to exemplary embodiments of the present invention, CDMA systems can support variable bit rate services, such as speech, by providing control information in each frame which specifies the instantaneous data symbol rate for that frame. In order to accomplish this in a regular time interval, physical channels can be organized in frames of equal length. Each frame carries an integer number of chips and an integer number of information bits.

Using this exemplary frame structure, bit rate control information can be provided for every CDMA frame by transmitting this information on a separate physical channel. The physical channels carrying the data and the control information can be denoted as physical data channel (PDCH) and physical control channel (PCCH), respectively. The spreading code, symbol rate, or equivalently spreading factor, of the PCCH are known a priori to the receiver.

Many potential advantages are attributable to variable rate transmission. For example, interference can be reduced for various users of the system since the chip rate is kept constant and a lower bit rate gives a higher spreading factor, thus allowing a lower transmit power. Those skilled in the art will readily appreciate how this ability to vary the information rate in a CDMA system can be used advantageously to vary other parameters.

Figure 1:
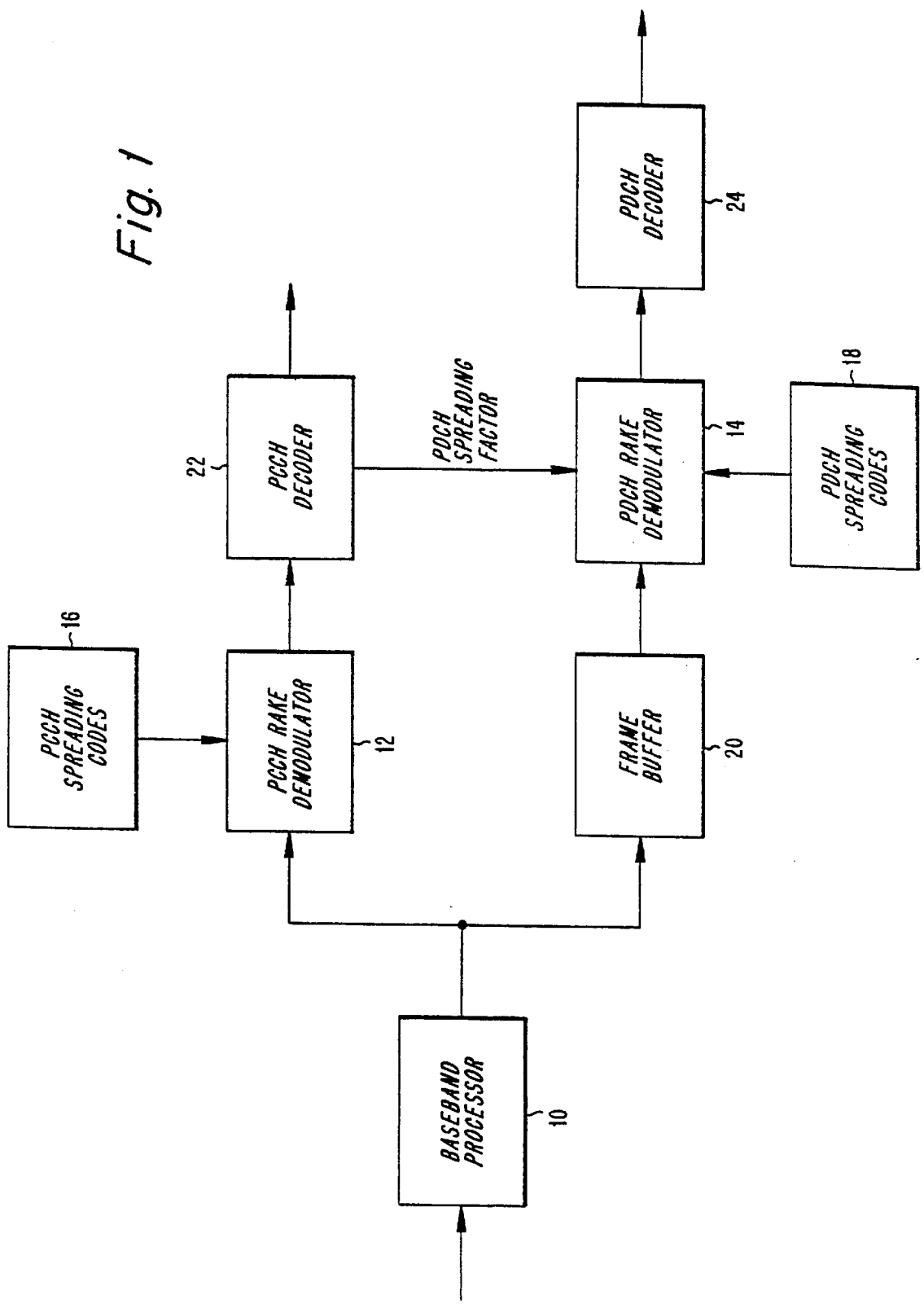
FIG. 1 is a block diagram representation of an exemplary receiver structure in which present invention can be implemented.

The structure of an exemplary receiver (usable, e.g., in either a base station or a mobile station) is illustrated in FIG. 1. The received signal is first processed to produce complex baseband samples by processor 10. Then the signal is distributed to signal processing branches including the control channel and data channel RAKE demodulators 12 and 14, respectively. Although only one PDCH signal processing branch is illustrated in FIG. 1, those skilled in the art will appreciate that a plurality of these branches can be included in receivers according to the present invention. The demodulators 12 and 14 are also provided with the corresponding spreading codes for the PCCH and PDCH by units 16 and 18. As described above, a PCCH frame contains relevant information about the structure of the concurrently transmitted PDCH and, therefore, the PCCH information is to be decoded before the PDCH can be demodulated. Thus, a frame buffer 20 upstream of the PDCH RAKE demodulator 14 delays input of the baseband signal thereto so that the PDCH RAKE demodulator 14 receives the spreading factor of the PDCH prior to decoding. This information related to the rate at which data was transmitted in the PDCH on a frame-by-frame basis is provided by PCCH decoder 22. A PDCH decoder 24 is also provided downstream for decoding of the PDCH as is well known in the art. The size of frame buffer 20 can be minimized in accordance with exemplary embodiments of the present invention as described below.

In order to fully appreciate how the size of buffer 20 can be reduced, a brief discussion of variable spreading factors and orthogonal codes is first provided. As mentioned above, variable rate services can be supported through spreading a data stream with a variable spreading factor. For example, consider a service which requires a first (lower) data rate during a first period and a second (higher) data rate during a second period and which is being supported using one PDCH between a mobile station and a base station. During the first period, a first spreading code can be selected based upon the first data rate. During the second period, a second spreading code can be selected for spreading frames to be transmitted at the second data rate. Since the second data rate is higher than the first data rate, the second spreading code will be shorter than the first spreading code.

Figure 2:
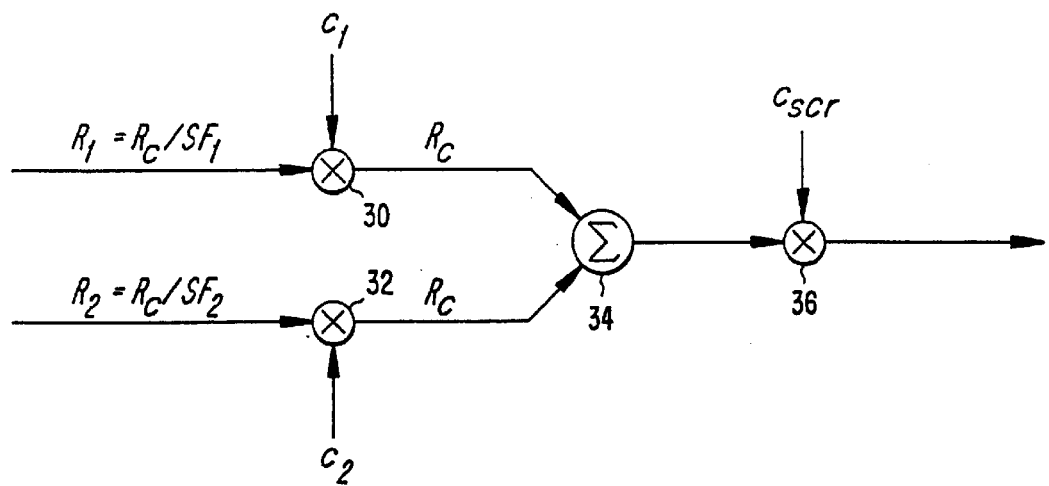
FIG. 2 illustrates variable spreading on two physical channels with common scrambling.

Moreover, a plurality of variable rate PDCHs can be handled in a similar manner. For example, a number of data streams can be spread to the chip rate using Walsh codes of different length, followed by summation and scrambling. FIG. 2 depicts these spreading and scrambling operations, exemplified for two physical channels. Therein, a first data stream is supplied to multiplier 30 having a data rate of $R_1$ which is equal to the chip rate $R_c$ divided by the spreading factor $SF_1$ for that data stream. This data stream is spread with a code word $C_1$ having a length which is selected such that the output of multiplier 30 is a physical channel at the chip rate $R_c$. Similarly, a second data stream is supplied to multiplier 32 having a second data rate $R_2$ which is equal to the chip rate $R_c$ divided by a second spreading factor $SF_2$. This data stream is spread with a second code word $C_2$ having a length which is selected to result in a physical channel at the chip rate $R_c$. The two physical channels are summed at summer 34 and then the composite signal is scrambled with a scrambling code $C_{scr}$ at block 36. The resultant signal is output, e.g., to transmit signal processing circuitry and ultimately coupled to an antenna. The rate of the data streams can be limited to such an interval that the spreading factors used are larger or equal to a predetermined $SF_{min}$.

Figure 3:
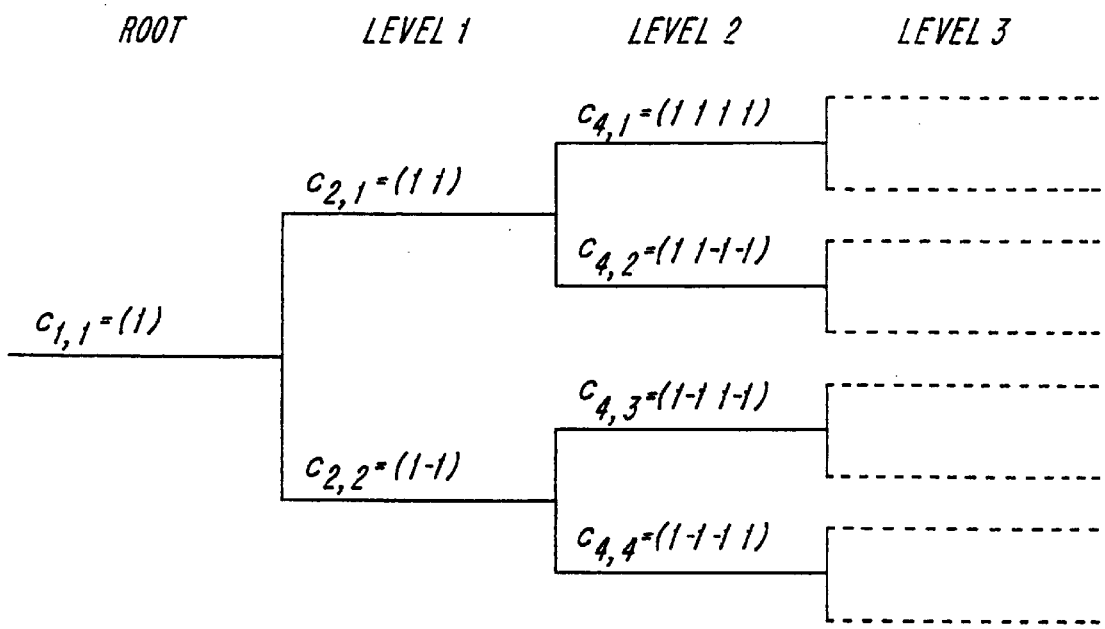
FIG. 3 is an exemplary code tree.

The Walsh codes used for spreading at multipliers 30 and 32 can be viewed in a tree like manner, as illustrated in FIG. 3. Codes on the same level in the tree are orthogonal and have the same spreading factor. If a physical channel is spread with a first code in the tree, and another physical channel is spread with another code which is (1) not the same as the first code, (2) not to the left of the first code on the path to the root of the tree and (3) not in the subtree which has the first code as the root, the spread physical channels will be orthogonal. Every physical channel is allocated a spreading code from the tree, with spreading factors matching the respective data rates. As the data rate varies for a particular PDCH, a code from a different level of the tree will be allocated. For example, increasing data rates will cause code selection to move to the left in the tree, while for decreasing data rates code selection will move to the right. Thus, a typical variable rate PDCH will typically move up and down along a certain path in the code tree as its data rate varies.

It can be seen in FIG. 3 that any given code in the tree is used to construct the codes to the right of it (i.e., further from the root). Thus, any given code can be seen as consisting of lower level codes that are on the way to the root of the code tree. Applicants have recognized that this code property can be used to reduce buffering requirements in the receiver.

Figure 4:
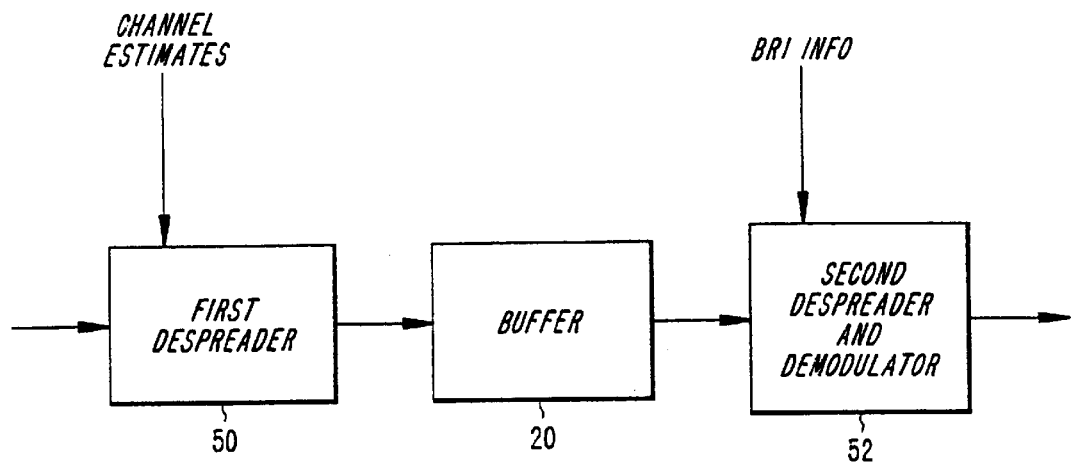
FIG. 4 illustrates two stage despreading according to an exemplary embodiment of the present invention.

In the receiver described with respect to FIG. 1, the received signal is descrambled and despread. However, before despreading a frame the receiver needs to know the spreading factor used for transmission of that frame. Since the BRI is transmitted in the same frame according to exemplary embodiments of the present invention, the signal needs to be buffered. However, Applicants have recognized that despreading with the largest common part of all Walsh codes that are available for a particular connection set up can be performed without buffering, i.e., before the BRI is decoded. Accordingly, the branch of the receiver illustrated in FIG. 1 that includes buffer 20 and PDCH RAKE demodulator 14 can be modified as illustrated in FIG. 4. Therein, the signal is correlated with a first code at the root of the subtree in which all possible codes are found at block 50 to partially despread the received symbols. This process is performed for all multipath rays, RAKE combining is done and the intermediate symbols obtained are buffered in buffer 20. Once the BRI has been decoded by the PCCH decoder 22 the intermediate symbols from buffer 20 are correlated with a second code at block 52 to get the despread raw bits. The code used for the second step of the despreading is easily identified from the code tree. For example, despreading the code (+1+1−1−1−1−1+1+1) can be implemented by first despreading with (+1+1) at block 50 followed by despreading with (+1−1−1+1) at block 52. Another alternative is despreading with (+1+1−1−1) at block 50 followed by (+1−1) at block 52. The former combination results in buffering intermediate symbols at a higher rate, and hence needs a larger buffer 20. In either case, however, buffering in accordance with the present invention is made at a rate significantly lower than the chip rate. For example, in a system using a variable spreading factor between 64 and 256, buffering is made at a rate 64 times lower than the chip rate.

Figure 5:
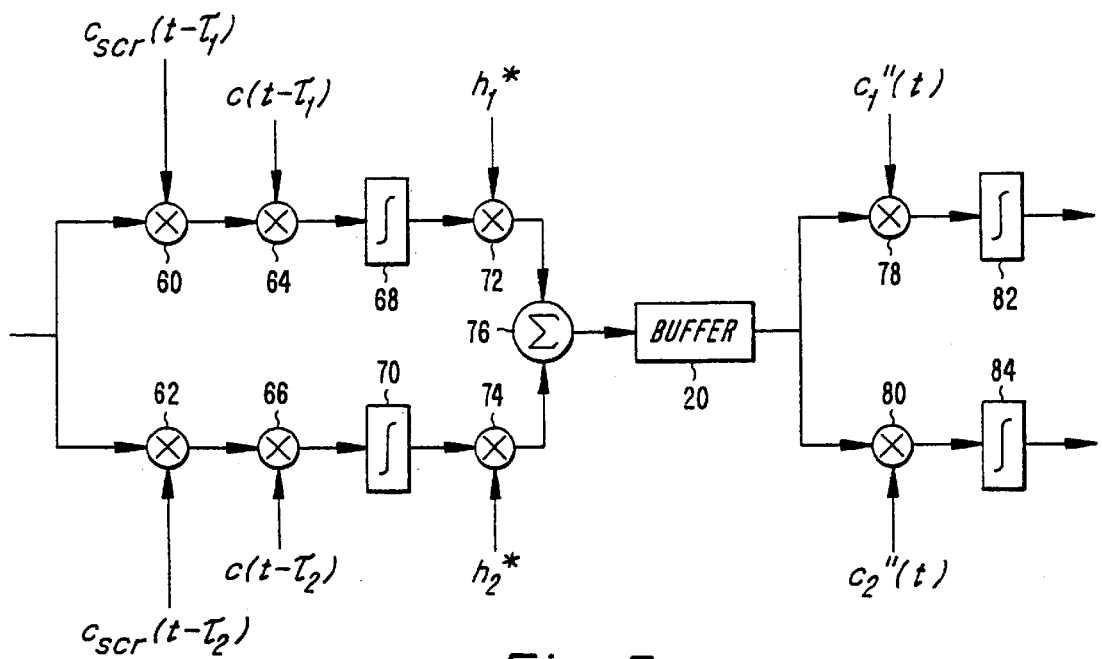
FIG. 5 illustrates a more detailed version of the block diagram of FIG. 4.

FIG. 5 depicts an exemplary despreading process according to the present invention for two codes in a two finger RAKE receiver. First, at blocks 60 and 62, the received signal is descrambled to reverse the process which was performed in block 36 of FIG. 2. Then, at block 64 and 66, the received signal is partially despread using the common code, i.e., the code at the leftmost portion of the code tree which is common to all of the variable spreading factor options for this particular transmission. The resulting partially despread signals are integrated at blocks 68 and 70, respectively, and modified based upon the channel estimates at blocks 72 and 74. These latter two operations are well known to those skilled in the art with respect to RAKE receiver signal processing. The resultant, partially despread signals are then summed at block 76 and introduced to buffer 20 wherein they are stored until the bit rate information can be provided from the PCCH decoder. Since, however, the signals have been partially despread before being stored in buffer 20, the data rate of storage is much lower than the chip rate, providing the designer with the opportunity to reduce the size of buffer 18. Once the BRI information is available for this frame, then the second codes $C_1''$ and $C_2''$ can be selected to complete the despreading operation at blocks 78 and 80, respectively. Again, the despread signals are integrated at blocks 82 and 84 and subsequent processing is performed as is well known in conventional RAKE receivers.

It will be understood that Applicants' invention is not limited to the particular embodiments described above and that modifications may be made by persons skilled in the art. The scope of Applicants' invention is determined by the following claims, and any and all modifications that fall within that scope are intended to be included therein.

We claim:

1. A receiver comprising:

means for receiving a spread spectrum signal including at least two physical channels;

means for partially despreading one of said at least two physical channels using a first code;

means for buffering said partially despread signal; and means for despreading said buffered signal using a second code.

2. The receiver of claim 1, wherein said spread spectrum signal is received at a chip rate and said means for buffering stores said partially despread signal at less than said chip rate.

3. The receiver of claim 1, wherein said at least two physical channels include a control channel and a first data channel.

4. The receiver of claim 1, wherein said one of said at least two physical channels can be received at any of a plurality of data rates and said first code is selected based upon said plurality of data rates.

5. The receiver of claim 3, further comprising:

means for demodulating and decoding said control channel to obtain bit rate information associated with said first data channel; and means for supplying said bit rate information to said means for despreading said buffered signal using at least a second code.

6. The receiver of claim 5, wherein said second code is selected based upon said bit rate information.

7. The receiver of claim 3, wherein said at least two physical channels further include a second data channel.

8. The receiver of claim 7, wherein said means for partially despreading also despreads said second data channel using said first code.

9. The receiver of claim 8, further comprising:

means for demodulating and decoding said control channel to obtain bit rate information associated with each of said first and second data channels; and wherein said despreading means selects said second code and a third code for despreading said first and second data channels, respectively, based upon said bit rate information.

10. The receiver of claim 9, wherein said bit rate information includes spreading factors for each of said first and second data channels.

11. The receiver of claim 5, wherein said bit rate information is a spreading factor.

12. The receiver of claim 8, wherein said first code is selected based upon code bits which are common to said first and second data channels.

13. A method for despreading a data frame comprising the steps of:

(a) despreading said data frame using a first code;

(b) buffering an output of step (a);

(c) determining a rate at which said data frame was transmitted; and (d) despreading said buffered output using a second code, said second code selected based upon said determined rate.

14. The method of claim 13, wherein step (b) further comprises the step of:

buffering said output at a rate that is less than a chip rate of said data frame.

15. The method of claim 13, wherein step (c) further comprises the step of:

obtaining said rate by despreading and decoding a control channel.

16. The method of claim 13, wherein step (a) further comprises the step of:

determining said first code based upon a plurality of rates at which said data frame can be transmitted.

17. A receiver comprising:

a first despreader for despreading a received spread spectrum signal;

a buffer connected to said first despreader for storing an output thereof; and a second despreader, connected to said buffer, for despreading said stored output wherein said first despreader despreads said received spread spectrum signal using at least two branches, each branch using a same first code to despread said received spread spectrum signal.

18. The receiver of claim 17, wherein said second despreader despreads said stored output using at least two branches, each branch using a code which is different from other codes used in said at least two branches.

19. The receiver of claim 17, wherein said first despreader descrambles said received spread spectrum signal using a scrambling code.

* * * * *